United States Patent [19]

Box et al.

[11] Patent Number: 5,586,045
[45] Date of Patent: Dec. 17, 1996

[54] METHOD OF CALIBRATING A HIGH RESOLUTION FLOWMETER AND MEASURING VOLUME FLOW

[75] Inventors: Gary W. Box, Golden Valley, Minn.; Michael D. Elberson, Elm Grove, Wis.

[73] Assignee: Graco Inc., Minneapolis, Minn.

[21] Appl. No.: 557,281

[22] Filed: Nov. 14, 1995

Related U.S. Application Data

[62] Division of Ser. No. 204,544, Mar. 2, 1994, Pat. No. 5,553,493.

[51] Int. Cl.[6] ............................................. G01F 1/00
[52] U.S. Cl. .................... 364/510; 364/509; 364/465; 364/571.01; 364/571.05
[58] Field of Search ............................... 364/509, 510, 364/573, 465, 474.17, 571.01–.05, .07; 74/606 R; 377/21, 17; 73/261, 3, 1 R, 861.03, .12, .77, .78; 324/207.25, 173; 340/606

[56] References Cited

U.S. PATENT DOCUMENTS

| 3,965,341 | 6/1976 | Honey et al. ......................... 364/510 |
| 4,253,341 | 3/1981 | Ikeda et al. ........................ 73/861.77 |
| 4,309,909 | 1/1982 | Grebe, Jr. et al. .................. 73/861.12 |
| 4,390,956 | 6/1983 | Cornforth et al. ...................... 364/510 |
| 4,534,046 | 8/1985 | Mihara ..................................... 377/21 |
| 4,678,992 | 7/1987 | Hametta ............................. 324/207.25 |
| 4,797,827 | 1/1989 | Cockerham ............................... 377/17 |
| 5,016,187 | 5/1991 | Forkert et al. ........................... 364/510 |
| 5,046,369 | 9/1991 | Boyd et al. .......................... 73/861.03 |
| 5,065,695 | 11/1991 | Baron et al. ............................ 364/510 |
| 5,184,519 | 2/1993 | Ciarelli et al. ....................... 73/861.77 |
| 5,225,995 | 7/1993 | Fujiwara et al. ........................ 364/510 |
| 5,504,789 | 4/1996 | Lew et al. ................................ 377/21 |

*Primary Examiner*—Ellis B. Ramirez
*Assistant Examiner*—Hal D. Wachsman
*Attorney, Agent, or Firm*—Palmatier, Sjoquist, Helget & Voigt, P.A.

[57] ABSTRACT

A method of calibrating and measuring volume flow through a gear-type flowmeter, having a magnetic sensor affixed to the flowmeter to detect incremental movement of the flowmeter teeth. The sensor is connected to an analog-to-digital converter and computer processor, which receives and stores samples of the sensor signals. The samples are compared with subsequently received samples to derive relative gear positions and to calculate volume flow based on the relative gear positions. The samples may also be analyzed and compared with previous samples to detect flowmeter wear and wobble conditions.

3 Claims, 7 Drawing Sheets

5,586,045

METHOD OF CALIBRATING A HIGH RESOLUTION FLOWMETER AND MEASURING VOLUME FLOW

This is a division of U.S. patent application Ser. No. 08/204,544, filed Mar. 2, 1994 now U.S. Pat. No. 5,553,493.

BACKGROUND OF THE INVENTION

The present invention relates to a liquid flowmeter apparatus having an electrical output for providing signals representative of volume flow and having a self-checking feature for monitoring pump wear and wobble.

The invention is particularly adaptable for use with a gear-type liquid flowmeter, wherein liquid flow is passed through a chamber having a pair of meshed gears causing the gears to rotate in step with the liquid volume passing through the flowmeter. The use of electrical signaling elements in conjunction with a liquid flowmeter is not itself a new technology, for various forms of magnetic sensors have been used for this purpose in the past. However, the present invention combines the electrical signal function to a higher degree of precision, combined with a self-checking function to enable the system to detect when the mechanical flowmeter components have departed from predefined specifications.

SUMMARY OF THE INVENTION

A gear-type liquid flowmeter is equipped with a magnet and magnetic sensor positioned so that the teeth of the flowmeter will disturb the magnetic field generated therebetween. The signal from the magnetic sensor is converted into a series of equally time-spaced digital values, and under constant flow conditions each value represents an instantaneous indication of gear tooth position. The instantaneous position values, under constant flow conditions, are mapped into a memory to provide a sequence of digital values which together are representative of the physical shape of the respective flowmeter gear teeth. This memory map is periodically compared against updated memory maps of the same nature, during constant flow conditions, to provide a calibrated method for determining the amount of wear and/or wobble which gradually builds up in the flowmeter, and the circuitry provides a warning signal when the flowmeter exceeds predetermined wear characteristics.

Furthermore, the memory map may be subdivided to provide highly precise indications of the respective teeth positions for the flowmeter gears. These subdivisions can be correlated to liquid volume flow and thereby provide a high resolution indication of volume flow through the flowmeter to a much higher precision than has heretofore been possible.

It is, therefore, a principal object of the present invention to provide a method of calibrating a flowmeter capable of high resolution indications of volume flow rate.

It is another principal object of the present invention to provide a system for monitoring the wear effects of a gear-type flowmeter.

An advantage of the present invention is that it provides a highly accurate reading of liquid volume flow while at the same time monitors flowmeter wear characteristics.

Another advantage of the present invention is that it enables an operator to specify in advance the wear characteristics which are acceptable for a flowmeter and to define the degree of wear which is deemed to be unacceptable.

The foregoing and other objects and advantages of the invention will become apparent from the following specification and claims and with reference to the appended drawings.

DESCRIPTION OF THE PREFERRED EMBODIMENT

Figure 1:
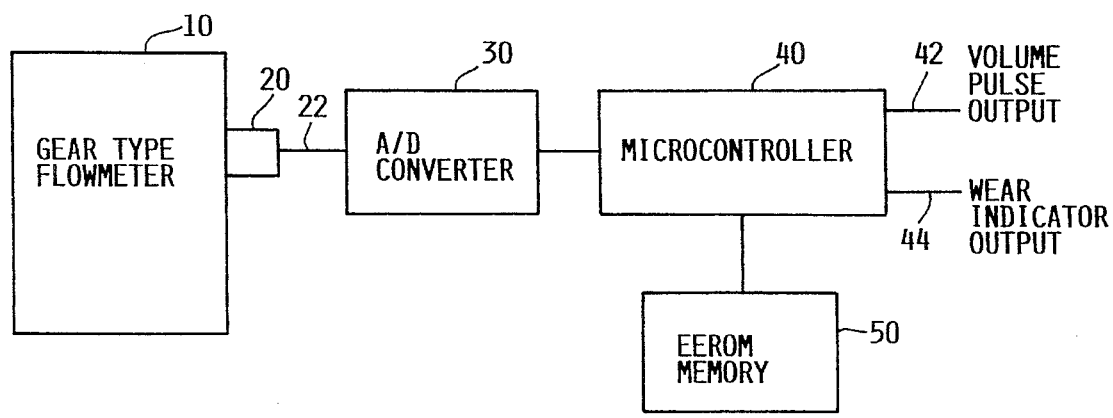
FIG. 1 shows a block diagram of the present invention.

A block diagram of the invention is shown in FIG. 1. A gear flowmeter 10 has a sensor 20 affixed thereto wherein the sensor is positioned to detect the movement of the gear teeth within flowmeter 10. The sensor 20 generates a continually varying electrical signal via line 22 which is representative of the shape of the gear teeth which pass through the sensor's field of view. This electrical signal is connected to an analog-to-digital (A/D) converter 30 which samples the voltage on line 22 at regular intervals and generates digital signals which correspond to each of the samples. The digital signals are processed by microcontroller 40 and are accumulated in a memory map in memory 50. Microcontroller 40 also transmits signals on output line 42 which are representative of liquid volume flow through flowmeter 10 and signals on line 44 which are representative of excessive wear of flowmeter 10.

Figure 2:
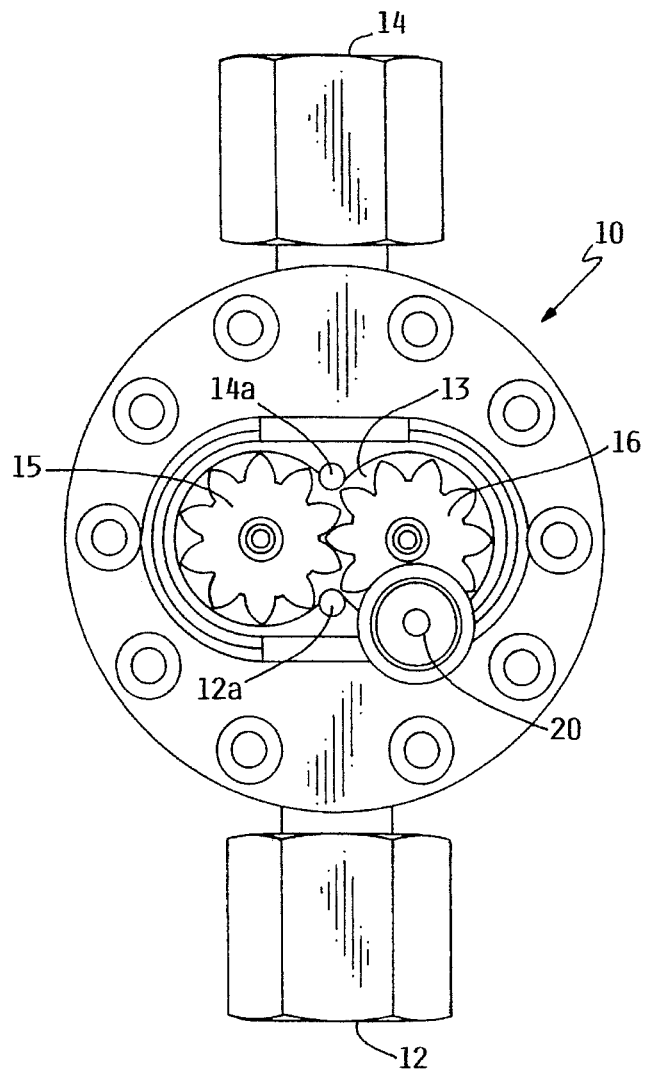
FIG. 2 shows a phantom view of a flowmeter and sensor coupled to the flowmeter.

FIG. 2 shows a phantom view of flowmeter 10 to illustrate the relative positions of the flowmeter gears 15, 16 and sensor 20. Flowmeter 10 has a liquid inlet 12 and a liquid outlet 14, and liquid passing into inlet 12 passes through passage 12a into chamber 13, and from there through passage 14a and through outlet 14. The flow of the liquid through chamber 13 causes the respective gears 15, 16 to rotate about their respective axes, and the rate of rotation is a measure of the liquid volume flow through flowmeter 10.

Figure 3A:
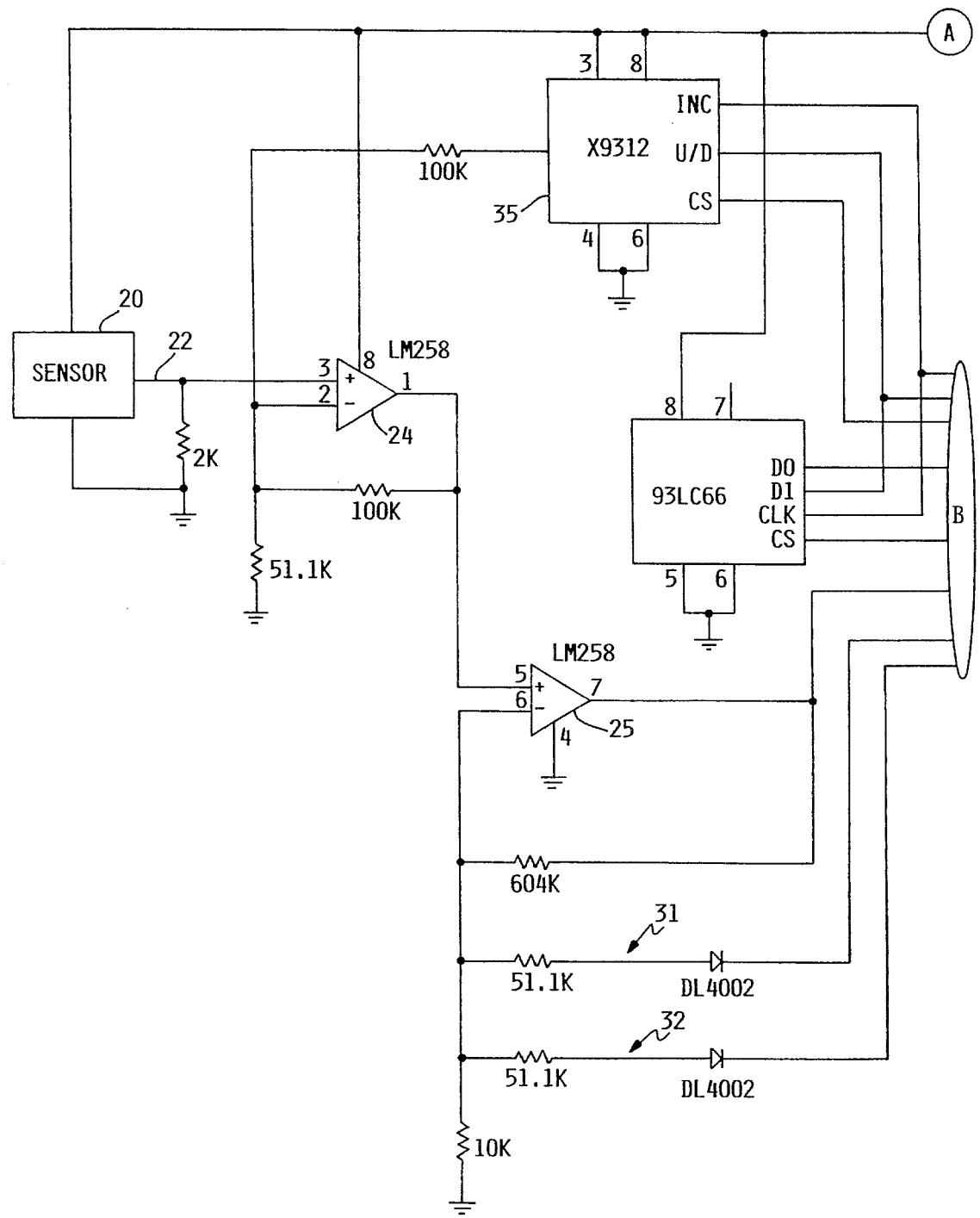
FIG. 3A shows a schematic diagram of the electronic circuits associated with the invention.
Figure 3B:
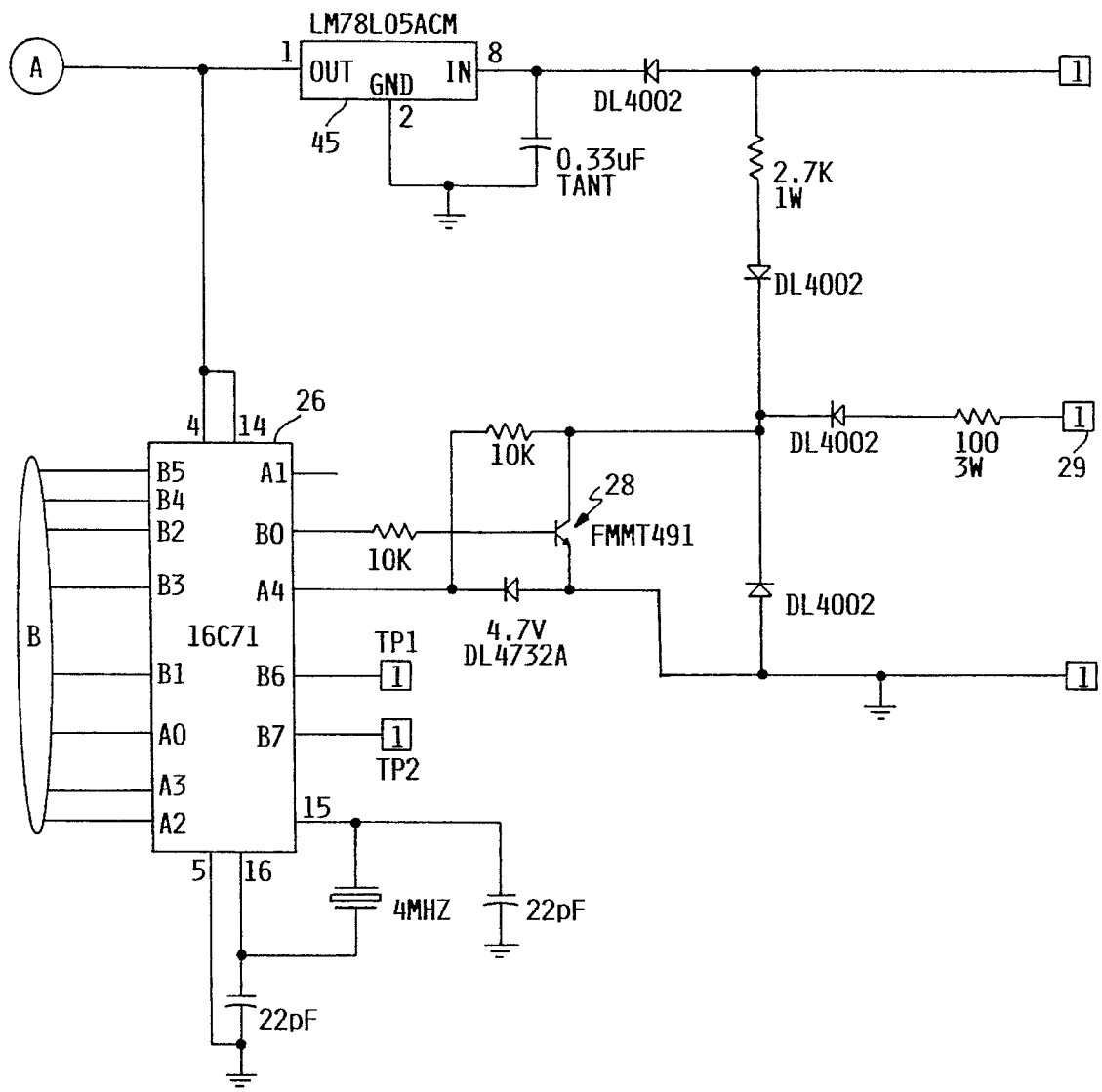
FIG. 3B shows a schematic diagram of further electronic circuits associated with the invention.

FIG. 3A and 3B show schematic diagrams of the circuits associated with the invention. The sensor 20 is preferably a Hall effect sensor which produces an electrical output signal proportional to the magnetic field it detects. In the preferred embodiment a sensor manufactured by Honeywell under Part No. SS49 is utilized. The sensor 20 is connected via a line 22 to a preamplifier 24 which is connected to an amplifier 25 and thence to the A0 input of the integrated circuit (IC) 26. The preamplifier 24 and amplifier 25 are preferably provided by a dual operational amplifier circuit of the type LM258M, manufactured by National Semiconductor. In the preferred embodiment, the A/D converter function 30 and the microcontroller function 40 are both accomplished by a single integrated circuit 26. IC 26 has the capability of performing an A/D conversion and also the computer processor capability of executing prestored programs which contain instructions represented by the flow charts presented herein. One form of IC which is suitable for this purpose is Type PIC16C71-16-I/SO, manufactured by Microchip.

The A0 input to IC 26 is an analog voltage input to an A/D converter within IC 26. The A/D converter produces a digital value corresponding to the analog voltage presented at the A0 input of circuit 26, and the digital value is transmitted serially in the form of an 8-bit binary signal via output pin B4. The signal sampling rate is preferably in the 20–50 Khz range, and each 8-bit binary signal is received by memory circuit 50 at terminal DI and is stored therein for later retrieval. Memory circuit 50 in the preferred embodiment is a 512-byte non-volatile memory, referred to as an "EEPROM," Type 93LC66-I/SN, manufactured by Microchip. Prior to the initiation of data transfer between the A/D converter and memory circuit 50, the B4 output terminal of IC 26 transmits a 10-bit binary address value to the DI terminal of memory 50. This address signal identifies the initial address for storage of the first digital value representative of the waveform sample. Thereafter, the memory address of memory 50 is incremented one count each time a new binary signal value is transmitted.

A voltage control circuit 35 is also provided for regulating the voltage level of the signals received by terminal A0 of IC 26. Voltage control circuit 35 functions as an electronically adjustable potentiometer, referred to as a "EEPOT," and one type of circuit which is usable within the preferred embodiment is Type X9312US, manufactured by Xicor. The voltage control circuit 35 may be activated by IC 26 applying a signal to the CS input terminal which operates as a "circuit select" signal. IC 26 may then apply either of two signals to the U/D terminal of circuit 35, indicative of whether the electronically adjustable potentiometer should be adjusted upwardly or downwardly. IC 26 also generates a plurality of signals at its output terminal B5, received by the INC input terminal of circuit 35, to indicate the number of incrementing steps which are required for adjustment of the electronically adjustable potentiometer circuit. By the foregoing control over circuit 35, IC 26 is programmable to select not only the midpoint voltage level received at its input terminal A0 but also to select the maximum and minimum input analog voltages which it will accept. During a calibration process, IC 26 input terminal A0 is provided with a known calibrated input analog voltage. The midpoint level of this calibrated voltage is set by the foregoing control signals developed by IC 26 and transmitted to voltage control circuit 35. The maximum and minimum values of the A0 input signal which are permitted are set by IC 26 selectively activating either the A2 or the A3 output terminals, or combinations thereof. The A2 and the A3 output terminals of IC 26 are respectively coupled to resistor/diode circuits 31, 32, which are connected into the gain control circuit for amplifier 25. Therefore, the gain of amplifier 25 may be selectively adjusted to any of four predetermined settings by manipulation of the signals at the A2 and A3 output terminals from IC 26. After calibration, the proper settings are maintained by the IC 26 output signals, and subsequent analog voltages fed into terminal A0 of IC 26 are converted to digital binary voltage signals which are based upon the calibration procedure.

After the initial calibration as been completed and a complete memory map has been prestored in memory 50, corresponding to the characteristics of flowmeter 10, IC 26 generates periodic output signals at its terminal B0. These periodic signals are representative of increments of the sinusoidal waveform generated by sensor 20 and are, therefore, representative of positional increments of each particular tooth in flowmeter 10. These signals are used to gate an output transistor 28 which is connected to an output terminal 29. Therefore, the signal present at output terminal 29 is indicative of respective 60-degree shifts in rotational position of each particular tooth in flowmeter 10; and a succession of such signals is representative of the complete rotation of a gear in flowmeter 10. For example, if each tooth in flowmeter 10 may be broken into six subdivisions and if flowmeter 10 has a total of ten teeth, an entire revolution of a gear in flowmeter 10 will produce 60 subdivisions representative of volume flow. Therefore, the resolution of flowmeter 10 is improved by a factor of six over the resolution of a comparable flowmeter system wherein flow is measured by counting only the movement of each tooth. Moreover, since the volume flow resolution is independent of rate of movement of the gears within flowmeter 10, it is possible to maintain the accurate, high resolution reading of volume flow under all conditions of flow rate. Transistor 28 is a voltage and current amplifier and is preferably a Type NPN transistor, designation FMMT491, manufactured by Zetex Corporation. The signal it presents at output terminal 29 may be connected to any of a wide range of suitable output devices. For example, the signal may be coupled to circuits for driving an indicator, or to input circuits to a digital processor for use in connection with various processing functions, or may be connected to drive suitable counter circuits for various reporting purposes.

The circuit of FIG. 3A and 3B is operable from a suitable power supply which produces an unregulated DC voltage input. The unregulated input voltage is connected to regulator circuit 45, which is a five volt voltage regulator circuit for producing a regulated five volt power output; this component is preferably a Type LM78LO5ACM circuit, manufactured by National Semiconductor.

Figure 4A:
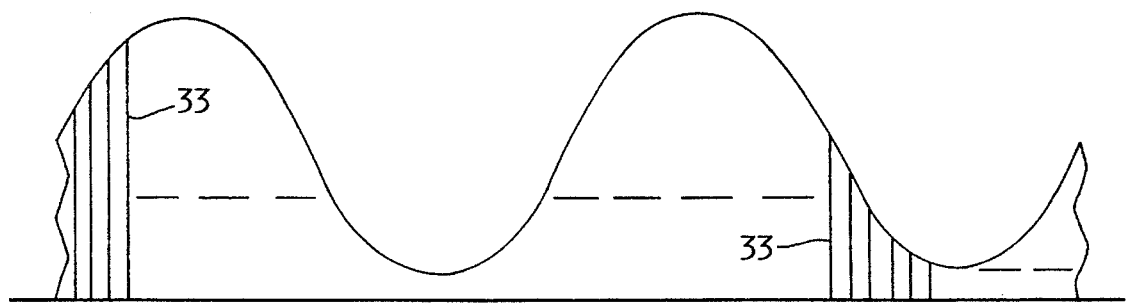
FIG. 4A–4C show wave form patterns for three types of flowmeter conditions.

FIG. 4A shows a representative voltage waveform of the type generated by sensor 20 during the calibration procedure and in connection with sensing the movement of gear teeth which are in unworn condition. This analog voltage is converted into a plurality of sequential digital values by the A/D converter circuit, and these digital values are stored in memory for future reference. The digital values are represented by the various line segments 33 in FIG. 4A.

Figure 4B:
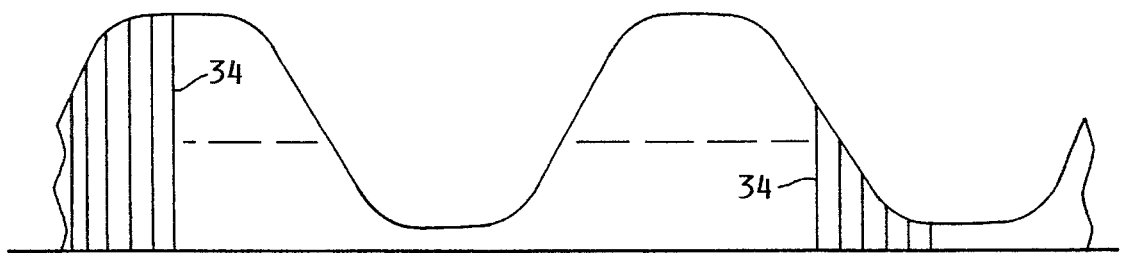

FIG. 4B shows a representative voltage waveform from sensor 20 under conditions wherein the gear teeth have become severely worn. Under these circumstances, the voltage waveform tends to take on a "flattened" shape, and this flattened shape is detectable by IC 26 upon comparison of the instantaneous digital values, shown as line segments 34, representative of this waveform versus the instantaneous digital values 33 representative of the calibrated waveform, when both sets of values are taken at the same relative gear position. The same relative gear position can be assured by merely looking up a predetermined address in memory 50, the contents of which will correspond to the binary voltage at a particular gear tooth position, and comparing this binary signal with the binary signal for the same tooth position as shown in FIG. 4B. If the respective binary signals differ by more than a predetermined value, IC 26 may be programmed to issue an alarm signal indicative of the need for repair and/or replacement of the flowmeter.

Figure 4C:
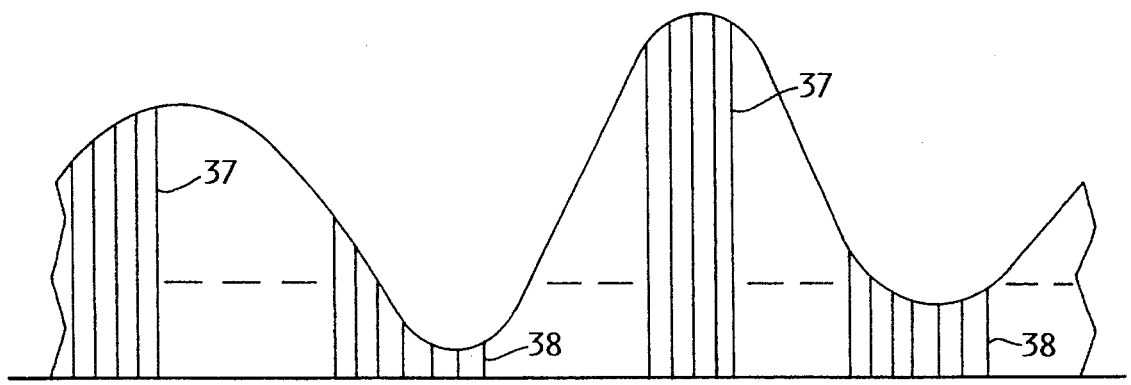

FIG. 4C shows a representative voltage waveform under conditions where the flowmeter bearings have worn, and the flowmeter gears are undergoing a certain degree of wobble. In this situation, the voltage waveform will have differing peak values depending upon the flowmeter shaft positions; i.e., line segments 37 and line segments 38; and these peak value differences can be detected by the same sort of procedure described above. In each case, the binary value corresponding to a predetermined angular position of a tooth is obtained from the prestored memory map for that tooth and is compared to the binary value at the same relative position for the same tooth. When the respective binary values differ by more than a predetermined value, IC 26 may issue an alarm signal indicative of the need to repair and/or replace the flowmeter.

Figure 5:
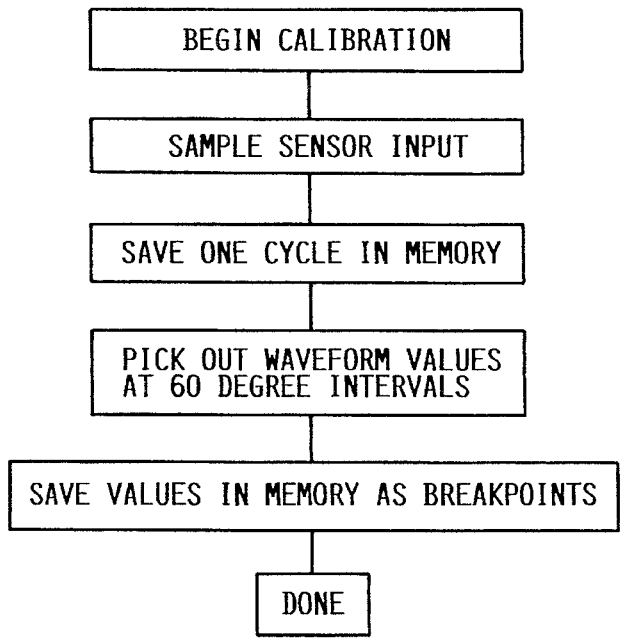
FIG. 5 shows a flow chart for calibrating the flowmeter system.

FIG. 5 shows a flow chart which is representative of the steps required for calibrating the circuits described herein. Of course, calibration is accomplished under conditions wherein the flowmeter is known to be in good shape and is operating under constant liquid flow conditions. The sensor voltage is sampled at a relatively high sampling rate; i.e., about 25–40 kilohertz, and voltage samples representative of a complete rotation of the flowmeter gear are stored into memory. The IC 26 selects one of the toothed waveform sample sets to be designated as the index tooth and references all subsequent samples on the basis of their respective memory locations relative to the index tooth memory locations. IC 26 then selects the binary voltage values representative of each equal-degree shift in tooth position and stores these values in memory as breakpoint values. Once the breakpoint values have been stored in memory for all of the flowmeter teeth, the calibration procedure is complete, and a base waveform is available for the subsequent comparison of binary values measured on the same basis.

Figure 6:
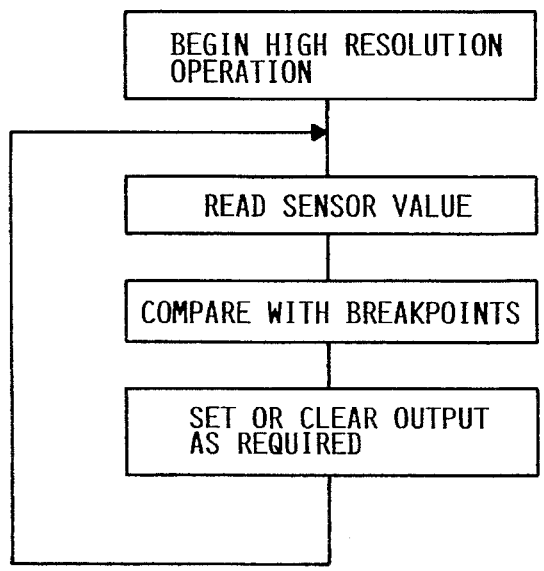
FIG. 6 shows a flow chart for generating signals representative of volume flow.

FIG. 6 shows a flow chart illustrating the sequence of operational steps of IC 26 in connection with the signals that are generated at its B0 output terminal. These signals are merely indications of each 60-degree transition of a gear tooth past the sensor 20. To accomplish this procedure, each binary value corresponding to a sensor voltage sample is read and compared with the respective breakpoint values previously stored in memory. Each time a match is found IC 26 generates a new signal at its output terminal B0, to drive transistor 28 in either of two states. When the next matching position signal is identified, IC 26 reverses the signal drive to transistor 28 to change the voltage level at the output of transistor 28. Therefore, output terminal 29 receives an alternating sequence of two voltages, one voltage indicative of a 60-degree position transition of a gear tooth and the next alternative voltage indicative of the next 60-degree positional transition of a gear tooth. Therefore, each voltage change at output terminal 29 is representative of a 60-degree tooth position change.

Figure 7:
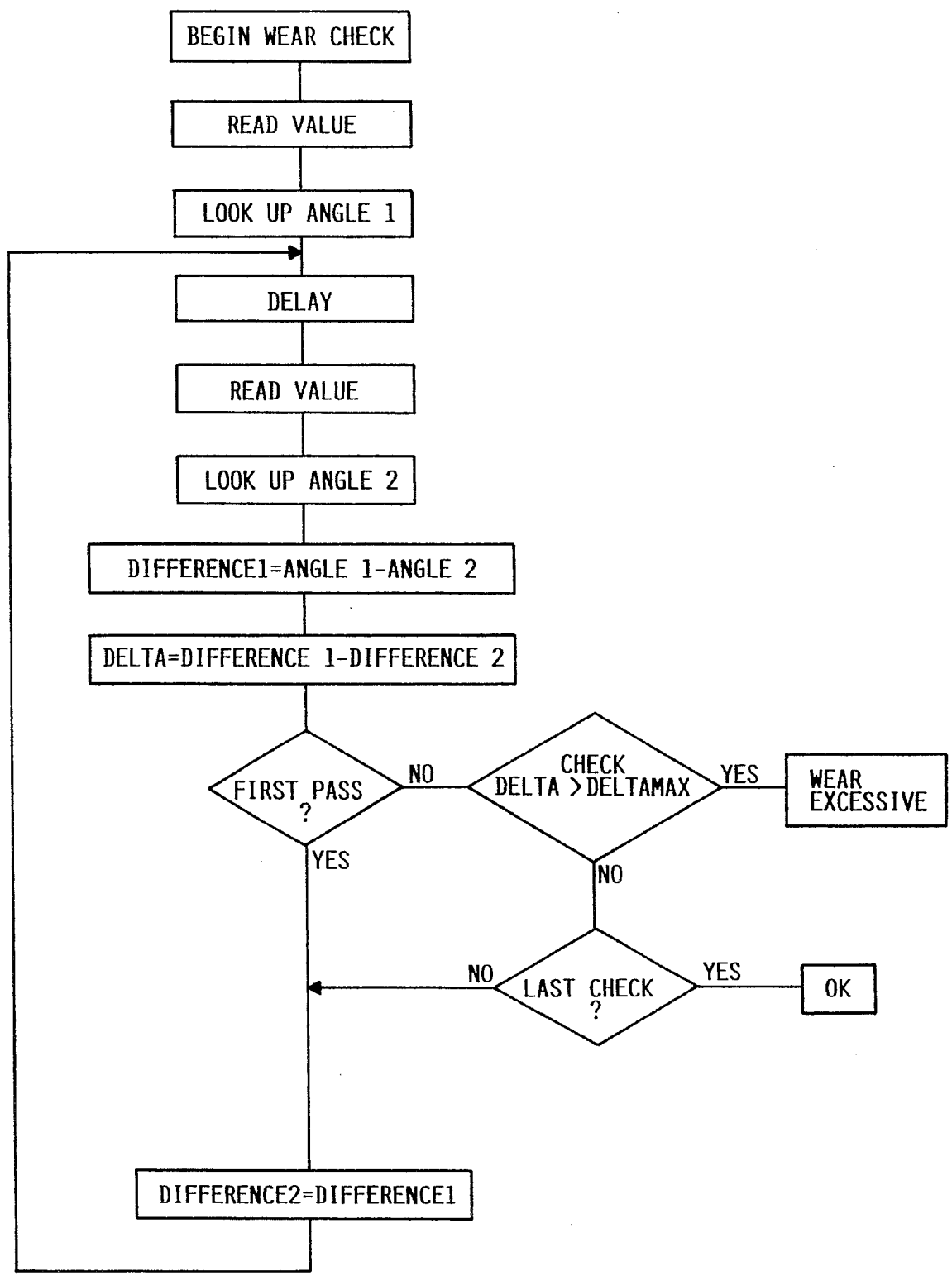
FIG. 7 shows a flow chart for checking wear of the flowmeter gear teeth.

FIG. 7 shows a flow chart illustrating the steps executed by microcontroller 40 when it checks the wear characteristics of the flowmeter. While this procedure is being executed the flowmeter must be running under constant flow conditions, so that the gears of the flowmeter are turning at a constant rate and the digital sample signals derived therefrom are representative of equal displacement angles of the gear rotation. During the execution of this wear test procedure, the microcontroller identifies which tooth of the flowmeter gear being monitored corresponds to the first tooth for which the previously recorded memory map was stored in memory 50; this is required so that the successive digital sample values will correspond respectively with the prestored memory map values for the same teeth. Although the flowmeter must be operating under constant flow conditions during the wear check procedure, it is not necessary that the flowmeter be operating at the same constant flow rate as it operated during the calibration procedure.

The first step of the process requires that a digital value be sampled at a particular toothed position. This digital value is compared with the prestored memory map to locate an equal value in the prestored memory, and the tooth position angle at which this previously was recorded is noted. Next, after a predetermined delay, a second digital value is read which is representative of a new position for the flowmeter tooth. Again, this value is compared against the prestored memory map to identify an equal value from the memory map, and the tooth angle for this previous value is noted. The difference between the first angle and the second angle from the memory map is calculated and is retained as "difference 1." Next, a "delta" value is calculated which comprises a subtraction of the "difference 1" value and the "difference 2" value which, during the first pass will yield a result equal to "difference 1." Since, in our example, this is the first pass the value "difference 2" becomes set to equal the value "difference 1," and the procedure is repeated. A new digital value is read from the sensor information, and this value is utilized to look up a corresponding value in the memory map which yields a new angle for that value (angle 2). A new "difference 1" value is calculated by subtracting angle 2 from angle 1, and a "delta" value is created by subtracting "difference 2" from "difference 1." This being the second pass through the process, the next step involves checking the "delta" value to determine whether it is greater than some predetermined maximum "delta" which has been prestored. If it is greater, an alarm signal may be generated to indicate excessive wear. If it is not greater, the process makes a check to determine whether the entire gear has been scanned; and if it has, the process ends. In our example, the entire gear has not been scanned; and therefore, the sequence is returned to the main cycle wherein the new "difference 2" is set to be equal to the "difference 1" value previously calculated. The sequence repeats itself again to derive a new "delta" value, and the checking steps are again accomplished. This proceeds during the rotation of the entire flowmeter gear; and when the last tooth has been checked, and no excessive wear conditions are detected, an exit is made from the procedure.

Figure 8:
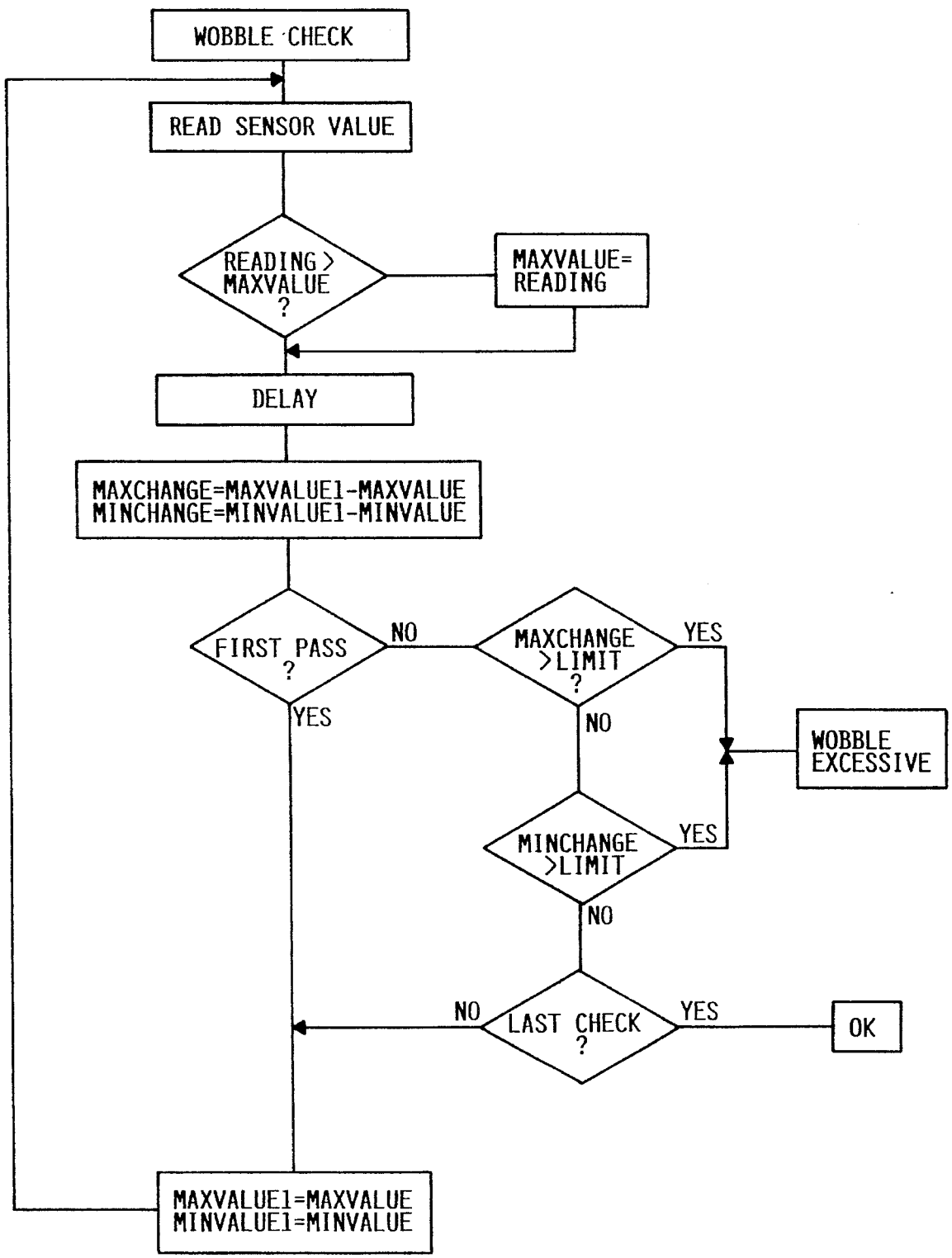
FIG. 8 shows a flow chart for checking flowmeter wobble.

FIG. 8 shows a flow chart describing the steps executed by the microcontroller in conjunction with a check for shaft wobble. In conducting this test, the flowmeter must also be turning at a constant flow rate. In the case of a wobble check, the objective is to determine whether the maximum and minimum values of the sensor signals depart more than a predetermined amount from predetermined base line values. Since all rotating machines have a certain amount of detectable shaft wobble, the objective of this procedure is to monitor the shaft wobble for changes over time and to alert the system operator when the shaft wobble has grown to a point which is deemed to be excessive. Therefore, it is the changes in wobble conditions which are calculated and compared against permissible limit values. The sensor output under wobble conditions is shown in exaggerated form in FIG. 4C, wherein the wobble condition is detectable because the respective minimum and maximum peak values of output voltage tend to shift from previous maximum and minimum peak values. The wobble condition can be detected by monitoring the maximum peak value and comparing it against the previous maximum peak value to determine the amount of change which has occurred. Likewise, the minimum peak value can be monitored and compared against previous minimum peak values to determine the amount of change which has occurred in these values. If either of these changes exceed predetermined limits which are selectable by the operator, the process will generate an output indication indicative of excessive wobble.

According to the process illustrated in FIG. 8, the initial step involves reading an instantaneous voltage from sensor 20 and comparing it against the previous sensor voltage to determine whether it is greater or less than the previous reading. If the current reading is greater, it is deemed to be a "max value" and the subsequent process steps are executed after a predetermined delay. Similarly, the current reading is compared against the previous reading to determine whether it is less than the previous reading; and if it is less, the current reading is substituted as the "min value" and the subsequent process steps are executed after the delay noted above.

The process then calculates the measured change between the current "max value"/"min value" from the previous corresponding values ("max value 1"/"min value 1"). The difference between the respective values is defined as either a "max change" or a "min change." Of course, during the first pass through the process this calculation will yield a meaningless result; and therefore, the first pass results in "max value 1" being set equal to "max value" and "min value 1" being set equal to "min value." The process steps are then repeated for the next subsequent sensor reading to obtain new values for "max value" and "min value." The "max change" and "min change" calculations are made again, and in each case the respective values are compared against predetermined limits. If either the "max change" exceeds a predetermined limit or the "min change" exceeds a predetermined limit, a signal is generated indicative of excessive wobble. If not, the process proceeds with a further check that is described above until all teeth have been checked according to the procedure. After all teeth have been checked according to the procedure, the process is exited.

The foregoing wear check procedures and wobble check procedures may be executed at any time during operation of the system. However, it is convenient to execute these processes shortly after each time the system is initially activated so that the user can obtain an initial wear check and wobble check evaluation prior to beginning the next period of use of the system.

The flow monitoring operation of the system continues whenever the system is activated, and the signal changes developed at output terminal 29 (see FIG. 3) can be coupled to any suitable indicator and/or monitoring apparatus to provide a continuation indication of volume passed through the flowmeter. Since these output signals are representative of volume caused by any desired and angular movement of the flowmeter shaft, the degree of precision in measuring volume is greatly increased over prior art systems which normally are capable of measuring only volume increments which are related to the angular movement of the shaft corresponding to respective individual flowmeter tooth positions.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed:

1. A method for calibrating and measuring volume flow through a gear-type flowmeter, comprising the steps of:
    a) measuring a plurality of incremental angular gear tooth positions of each gear tooth of said flowmeter under known constant flow conditions;
    b) converting said measured plurality of incremental angular gear tooth positions to respective base digital values;
    c) correlating each of said base digital values to one of said plurality of incremental angular gear tooth positions; and to a respective portion of said known constant flow;
    d) sampling subsequent incremental angular gear tooth positions under any flow conditions, and converting said samples to new digital values;
    e) matching said new digital values to said base digital values to derive the corresponding angular gear tooth positions for said new digital values; and
    f) correlating the difference between the number of said new digital values versus the number of said base digital values to derive volume flow quantities corresponding to said differences.

2. A method of calibrating detected gear tooth positions in a gear-type flowmeter under constant flow conditions and thereafter measuring volume flow under all flow conditions, comprising the steps of:
    a) constructing a memory map of base values corresponding to incremental gear tooth positions under constant flow conditions;
    b) determining the volume flow corresponding to the difference between any two of said base values;
    c) periodically and subsequently detecting new gear tooth positions under any flow conditions and constructing new values corresponding thereto; and
    d) matching said new values to said memory map of base values to determine the volume flow corresponding to the difference between a base value and a corresponding new value, both measured for the same incremental gear tooth position.

3. A method of calibrating detected gear tooth positions in a gear-type flowmeter to establish a gear tooth profile, and thereafter detecting incremental gear tooth positions to monitor gear wear, comprising the steps of:
    a) constructing a memory map of base values corresponding to equal incremental gear tooth positions under constant flow conditions;
    b) subsequently detecting equal new incremental gear tooth positions under constant flow conditions and calculate new values corresponding to said new incremental gear tooth positions;
    c) matching said new values to said base values to determine the difference between each new value and the base corresponding to the same gear tooth position; and
    d) generating an alarm signal if said new values are different from said base values by more than a predetermined amount.

* * * * *